US010129827B2

(12) United States Patent
Latheef et al.

(10) Patent No.: US 10,129,827 B2
(45) Date of Patent: Nov. 13, 2018

(54) UE AND METHOD THEREOF FOR APPLYING COMMON DISCONTINUOUS RECEPTION CONFIGURATION

(71) Applicant: Samsung Electronics Co., Ltd, Gyeonggi-do (KR)

(72) Inventors: Fasil Abdul Latheef, Bangalore (IN); Neha Sharma, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

(21) Appl. No.: 15/331,784

(22) Filed: Oct. 21, 2016

(65) Prior Publication Data

US 2017/0339744 A1 Nov. 23, 2017

(30) Foreign Application Priority Data

May 17, 2016 (IN) ............................. 201641017002

(51) Int. Cl.

*G08C 17/00* (2006.01)
*H04W 52/02* (2009.01)
*H04W 76/28* (2018.01)
*H04W 88/06* (2009.01)
*H04L 1/18* (2006.01)

(52) U.S. Cl.

CPC ... *H04W 52/0216* (2013.01); *H04W 52/0235* (2013.01); *H04W 76/28* (2018.02); *H04L 1/1812* (2013.01); *H04W 88/06* (2013.01); *Y02D 70/20* (2018.01)

(58) Field of Classification Search

CPC ............ H04L 1/1812; H04W 52/0216; H04W 52/0235; H04W 76/048; H04W 88/06

See application file for complete search history.

(56) References Cited

U.S. PATENT DOCUMENTS 8,824,347 B2 * 9/2014 Pelletier ................ H04L 1/1883 370/311
9,831,999 B2 * 11/2017 Koivisto ............... H04L 5/0073
2012/0140689 A1 6/2012 Pelletier et al.
2014/0073306 A1 * 3/2014 Shetty ............... H04W 36/0088 455/418
2017/0006570 A1 * 1/2017 Xu ........................ H04W 56/00
2017/0367045 A1 * 12/2017 Rahman ............ H04W 52/0216

FOREIGN PATENT DOCUMENTS

WO WO 2014/065998 A1 5/2014
WO WO 2014/079017 A1 5/2014

* cited by examiner

*Primary Examiner* — Minh Trang T Nguyen

(57) ABSTRACT

Embodiments herein provide a method applying a common Discontinuous Reception (DRX) configuration at a User Equipment (UE) in a multi-connectivity mode. The method includes detecting, by the UE, a common DRX criterion. Further, the method includes forcing, by the UE, the DRX ON state of the first DRX cycle to a DRX OFF state. Further, the method includes forcing, by the UE, the first DRX cycle to wake up when one of a second DRX cycle transits from the DRX OFF state to the DRX ON state and a common DRX time period expires.

20 Claims, 13 Drawing Sheets

UE AND METHOD THEREOF FOR APPLYING COMMON DISCONTINUOUS RECEPTION CONFIGURATION

CROSS-REFERENCE TO RELATED APPLICATION(S) AND CLAIM OF PRIORITY

This application claims priority under 35 U.S.C. § 119(a) to a Indian Patent Application filed on May 17, 2016, and assigned Application Serial No. 201641017002, the entire contents of which are incorporated herein by reference.

TECHNICAL FIELD

The present disclosure relates to wireless communication systems, and more particularly related to a method for applying a common Discontinuous Reception (DRX) configuration at a User Equipment (UE) in a multi-connectivity mode.

BACKGROUND

In the conventional systems and methods, if cells from multiple eNodeB's (eNBs) are configured as serving cells to a UE then, multiple DRX configurations are associated with the UE as each of the eNB will have its associated DRX configuration. Further, the UE is in DRX on state for most of the duration due to the mismatch of the two independent DRX cycle states. Thus, leading to an increase in cumulative power consumption by the UE as the UE is not in a complete DRX OFF state or a sleep state for a significant amount of time. Further, working assumptions on the DRX as agreed in RAN2#83bis are described below:

Separate DRX configuration should be supported for a Master eNB (MeNB) and a Small eNB (SeNB).

Separate DRX operations (timers and active time) should be allowed for the MeNB and the SeNB.

Based on the above assumptions, both MeNB and SeNB have the functionality of configuring the UE DRX parameters by itself. Further, it would be difficult for both eNBs to have same configuration as each of the eNBs serve different users. The different DRX configurations would result in high power consumption at the UE.

SUMMARY

The principal object of the embodiments herein is to provide a method for applying a common DRX configuration at a UE in a multi-connectivity mode.

Another object of the embodiments herein is to provide a method for detecting time duration between a DRX on state of a first DRX cycle and a transition from a DRX off state to a DRX on state of a second DRX cycle meets the common DRX time period.

Another object of the embodiments herein is to split the DRX on state of the first DRX cycle into a forced DRX off state and a forced on state to align a time duration of the forced off state of the first DRX cycle with an off duration of the second DRX cycle when the common DRX criteria is detected.

Another object of the embodiments herein is to split the DRX on state of the first DRX cycle into a forced DRX off state and a forced DRX on state to align a time duration of the forced DRX on state of the first DRX cycle with an on duration of the second DRX cycle.

Another object of the embodiments herein is to detect time duration between start of a DRX on state of the first DRX cycle and a transition from a DRX off state to a DRX on state of a second DRX cycle meets the common DRX time period.

Another object of the embodiments herein is to delay the transition from the DRX off state to the DRX on state of the first DRX cycle by the common DRX time period to align a time duration of the delayed off state of the first DRX cycle with an off duration of the second DRX cycle when the common DRX criteria is detected.

Another object of the embodiments herein is to delay the transition to the DRX on state of the first DRX cycle by the common DRX time period to align the time duration of the forced on state of the first DRX cycle with the on duration of the second DRX cycle.

Another object of the embodiments herein is to detect uplink data transmission during the DRX off state of the first DRX cycle.

Another object of the embodiments herein is to delay the transition from the DRX off state to the forced DRX on state of the first DRX cycle by a minimum time duration to align the on duration of the forced DRX on state with the on duration of the second DRX when the common DRX criteria is detected Accordingly the embodiments herein provide a method for applying a common DRX configuration at a UE in a multi-connectivity mode. The method includes detecting, by the UE, a common DRX criterion. Further, the method includes forcing, by the UE, a DRX on state of a first DRX cycle to a DRX off state. Further, the method includes forcing, by the UE, the first DRX cycle to wake up when a second DRX cycle transits from a DRX OFF state to a DRX on state or a common DRX time period expires.

In an embodiment, the common DRX criteria is a time duration between the DRX on state of the first DRX cycle and a transition from a DRX OFF state to the DRX on state of the second DRX cycle meets the common DRX time period.

In an embodiment, the DRX on state of the first DRX cycle is split into a forced DRX OFF state and a forced DRX on state to align a time duration of the forced DRX OFF state of the first DRX cycle with a time duration of the DRX OFF state of the second DRX cycle when the common DRX criteria is detected.

In an embodiment, the DRX on state of the first DRX cycle is split into a forced DRX OFF state and a forced DRX on state to align a time duration of the forced DRX on state of the first DRX cycle with a time duration of the DRX on state of the second DRX cycle.

In an embodiment, the common DRX criteria is time duration between start of the DRX on state of the first DRX cycle and a transition from the DRX OFF state to the DRX on state of the second DRX cycle meets the common DRX time period.

In an embodiment, a transition from a DRX OFF state to a DRX on state of the first DRX cycle is delayed by the common DRX time period to align a time duration of the delayed OFF state of the first DRX cycle with a time duration of the DRX off state of the second DRX cycle when the common DRX criteria is detected.

In an embodiment, a transition from a DRX off state to a DRX on state of the first DRX cycle is delayed by the common DRX time period to align a time duration of the forced on state of the first DRX cycle with a time duration of the DRX on state of the second DRX cycle.

In an embodiment, the common DRX criteria is uplink data transmission during a DRX off state of the first DRX cycle.

In an embodiment, transition from a DRX off state to a forced DRX on state of the first DRX cycle is delayed by a minimum time duration to align on duration of the forced DRX on state with on duration of the second DRX when the common DRX criteria is detected.

In an embodiment, the common DRX time period comprises a time period of a hybrid automatic repeat request round trip time (HARQ RTT) and a time period of at least one transmission time interval (TTI).

In an embodiment, the common DRX time period includes a time period of an integer multiple of a HARQ RTT and a time period of at least one TTI.

In an embodiment, the common DRX time period includes a time period of a HARQ RTT.

In an embodiment, the common DRX time period includes a time period of an integer multiple of a HARQ RTT.

Accordingly the embodiments herein provide a UE for applying a common DRX configuration in a multi-connectivity mode. The UE includes a memory unit and a processor unit. The processor unit coupled to the memory unit configured to detect common DRX criteria. Further, the processor unit is configured to force a DRX on state of a first DRX cycle to a DRX on state. Further, the processor unit is configured to force the first DRX cycle to wake up when a second DRX cycle transits from a DRX OFF state to a DRX on state or a common DRX time period expires.

Accordingly the embodiments herein provide a computer program product comprising computer executable program code recorded on a computer readable non-transitory storage medium. The computer executable program code when executed causing the actions including detecting a common DRX criteria. Further, the computer executable program code when executed causing the actions including forcing a DRX on state of a first DRX cycle to a DRX off state. Further, the computer executable program code when executed causing the actions including forcing the first DRX cycle to wake up when a second DRX cycle transits from a DRX off state to a DRX on state or a common DRX time period expires.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This disclosure is illustrated in the accompanying drawings, throughout which like reference letters indicate corresponding parts in the various figures. The embodiments herein will be better understood from the following description with reference to the drawings, in which.

DETAILED DESCRIPTION

Figure 1A:
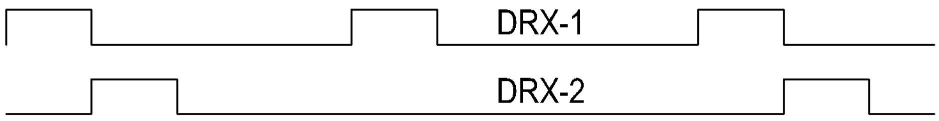
FIGS. 1*a*-1*c* illustrate some possible independent connected mode DRX (C-DRX) configurations from a network.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein provide a method applying a DRX configuration at a UE in a multi-connectivity mode. The method includes detecting a common DRX criterion. Further, the method includes forcing the DRX ON state of the first DRX cycle to a DRX OFF state. Further, the method includes forcing the first DRX cycle to wake up when one of the second DRX cycle transits from the DRX OFF state to the DRX ON state and a common DRX time period expires.

In the conventional systems and methods, the two DRX cycles (i.e., first DRX cycle and the second DRX cycle) are not aligned (i.e., both the DRX cycles are not in wake up/active state/ON state at the same time). In an example, consider a scenario where the first DRX cycle is configured with the following DRX parameters described below:

Inactivity timer=6 ms
On Duration=8 ms
DRX cycle=40 ms

Further, the second DRX cycle is configured with the following DRX parameters described below:

Inactivity timer=8 ms
On Duration=8 ms
DRX cycle=80 ms

In one example, as per the first and second DRX cycle configuration parameters, for every 2 cycles of the first DRX cycle, the transition to ON duration of the first DRX cycle (i.e., shorter DRX cycle length) does not perfectly align to the second DRX cycle. Further, both DRX cycles are not configured to be simultaneously in ON duration at any point of time.

Further in another example, as per the first and second DRX cycle configuration parameters, for every 2 DRX cycles; the transition from the DRX OFF to the DRX ON aligns with each other. Therefore, there is no increased power consumption as the 2 DRX cycles are in the DRX ON together and the DRX OFF together for half of the configured DRX cycle.

In another example, consider a scenario where the second DRX cycle is configured with the following DRX parameters as described below:

Inactivity timer=8 ms
On Duration=8 ms
DRX cycle=64 ms

As per the first and second DRX cycle configuration parameters, for every first DRX cycle, the transition to ON duration of the first DRX cycle (shorter DRX cycle length) does not perfectly align with the second DRX cycle. It is also possible that the ON durations do not align during the complete ON duration (both the DRX cycles are not configured to be in ON duration at any point of time). In order to mitigate the problems existing in the conventional systems and methods described above, following proposals are used as described below:

Unlike conventional systems and methods, the proposed method can be used to split the DRX ON state of the first DRX cycle based on the state of the second DRX cycle. In conventional systems and methods, the UE can wake up during its configured DRX configuration and remains in the ON state till its ON state related timers are expired. On contrary, in the proposed mechanism, the DRX state of an eNodeB, cell, or carrier monitors the DRX state of the other configured cell or carrier and takes the decision of splitting its ON state in order to reduce power consumption by aligning the ON states of both the configured DRX cycles (i.e., first DRX cycle and the second DRX cycle) to the maximum duration possible.

Unlike the conventional systems and methods, the proposed mechanism can be used to delay the DRX OFF state to the DRX ON state transition of one of the configured DRX cycles based on the state of the other configured DRX cycle. In the conventional systems and methods, the UE wake up during its configured DRX configuration. On contrary, in the proposed mechanism, the DRX state of one cell or carrier monitors the DRX state of the other configured cell or carrier and takes the decision to trigger (i.e., wake up) during the configured DRX cycle or to delay its transition to the ON state in order to reduce the power consumption.

Unlike conventional systems and methods, the proposed mechanism can be used to delay the force wake up by a defined duration in order to align the DRX ON states of the first DRX cycle and the second DRX cycle to reduce the power consumption. In an example, consider a scenario when there is an Uplink (UL) data pending for transmission when the UE is in the DRX OFF state. A scheduling request is triggered and sent to the network over the configured Physical Uplink Control Channel (PUCCH) or a random-access channel (RACH). In this scenario, the sleep period is disturbed and the UE forcefully breaks the DRX OFF duration and transitions to the ON state in order to send the scheduling request.

Unlike conventional systems and methods, the proposed mechanism can be used to delay the DRX OFF state to the forced DRX ON state transition for sending the scheduling request for the pending UL data. In conventional systems and methods, the UE performs a force wake up in between the DRX OFF state in order to perform the UL transmission. On contrary, in the proposed mechanism, the channel on which the UL data is pending for the transmission monitors its own as well as the other DRX states in order to take the decision of performing the forced DRX transition to the ON state based on the expected result of minimizing the power consumption.

Referring now to the drawings, and more particularly to FIGS. 1*a* through 12, where similar reference characters denote corresponding features consistently throughout the figures, there are shown preferred embodiments.

Figure 1B:
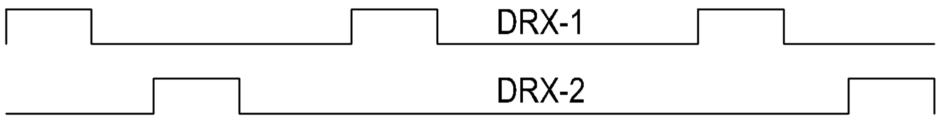
Figure 1C:
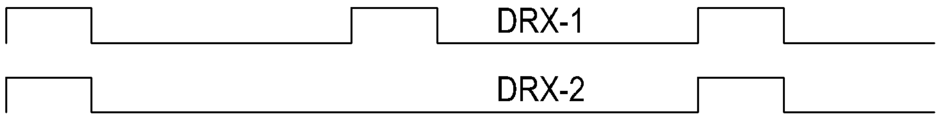

FIGS. 1*a*-1*c* illustrate some possible independent C-DRX configurations from a network.

FIG. 1*a* shows two DRX cycles received from the different networks by the UE. The two different DRX cycles (i.e., not aligned) namely a first DRX cycle and a second DRX cycle, when an ON state of the first DRX cycle is terminated, the second DRX cycle is initiated. Thus, there is a mismatch in the ON duration of the two different DRX cycles. The first DRX cycle and the second DRX cycle differ by a small duration of time. When this kind of scenario arises, the proposed mechanisms of splitting the ON duration or delaying the OFF to ON transition of the C-DRX cycle leading in time to force wake up when the lagging DRX cycle transits to the ON state. This results in matching of the DRX ON state of the two DRX cycles, thereby reducing power consumption of the UE.

FIG. 1*b* shows two DRX cycles received by the UE from the networks. The ON state of the second DRX cycle is during the OFF state/sleep state of the first DRX cycle. Thus, there is a mismatch in the ON duration of the first DRX cycle and the ON duration of the second DRX cycle. The ON duration of the first DRX cycle and the ON duration of the second DRX cycle are differing by the small duration of time. Due to the mismatch of the ON and OFF duration of the first and second DRX cycles, the power consumption of the UE increases. When this kind of scenario arises, the proposed mechanisms of splitting the ON duration or delaying the OFF to ON transition of the C-DRX cycle leading in time to force wake up when the lagging DRX cycle transits to the ON state. This results in matching of the DRX ON state of the two DRX cycles, thereby reducing the power consumption of the UE.

FIG. 1*c* shows two DRX cycles received by the UE from the respective networks and are aligned. In such cases, there arises no need to apply optimization. However, if the two DRX cycle lengths are not integer multiple of one another, then they will lead to being unaligned or partially aligned in later DRX cycles. When this kind of scenario arises, the proposed mechanisms of splitting the ON duration or delaying the OFF to ON transition of the C-DRX cycle leading in time to force wake up when the lagging DRX cycle transits to the ON state.

Unlike the conventional systems and methods, when there is the mismatch in the two different DRX cycles. The proposed mechanism can be used to split the DRX ON state of the first DRX cycle into a forced DRX OFF state and a forced ON state to align a time duration of the forced OFF state of the first DRX cycle with an OFF duration of the second DRX cycle. In another embodiment, the proposed mechanism can be used to delay the DRX OFF state of the first DRX cycle by a common DRX time period to align the time duration of the delayed OFF state of the first DRX cycle with the OFF duration of the second DRX cycle. In another embodiment, the proposed mechanism can be used to delay transition from the DRX OFF state to the forced DRX ON state of the first DRX cycle by minimum time duration to align the ON duration of the forced DRX ON state with the ON duration of the second DRX, as explained in conjunction with the FIGS. 2-10.

Figure 2:
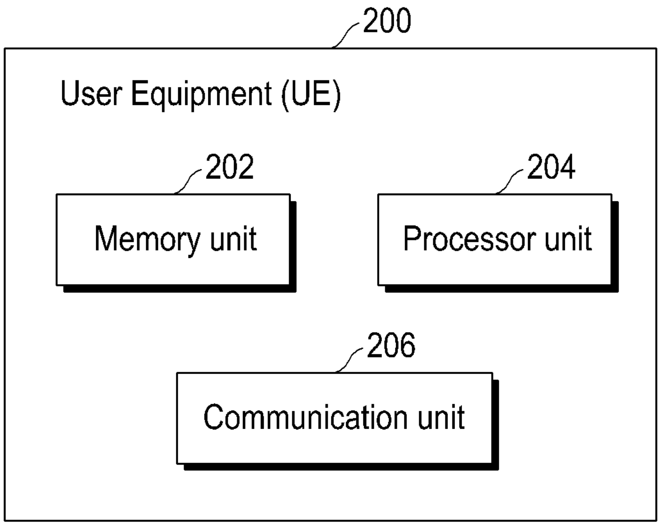
FIG. 2 illustrates various units of a UE, according to an embodiment as disclosed herein.

FIG. 2 illustrates various units of the UE, according to an embodiment as disclosed herein. In an embodiment, the UE 200 includes a memory unit 202, a processor unit 204, and a communication unit 206.

The memory unit 202 may include one or more computer-readable storage media. The memory unit 202 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory unit 202 may, in some examples, be considered a non-transitory storage medium. The term "non-transitory" may indicate that the storage medium is not embodied in a carrier wave or a propagated signal. However, the term "non-transitory" should not be interpreted to mean that the memory unit 202 is non-movable. In some examples, the memory unit 202 can be configured to store larger amounts of information than the memory. In certain examples, a non-transitory storage medium may store data that can, over time, change (e.g., in Random Access Memory (RAM) or cache).

The processor unit 204 coupled to the memory unit 202 configured to detect the time duration between a DRX ON state of the first DRX cycle and a transition from the DRX OFF state to the DRX ON state of the second DRX cycle meets a common DRX time period. In an embodiment, the processor unit 204 can be configured to split the DRX ON state of the first DRX cycle into the forced DRX OFF state and the forced DRX ON state to align a time duration of the forced OFF state of the first DRX cycle with the OFF duration of the second DRX cycle. In another embodiment, the processor unit 204 can be configured to split the DRX ON state of the first DRX cycle into the forced DRX OFF state and the forced DRX ON state to align a time duration of the forced ON state of the first DRX cycle with an ON duration of the second DRX cycle. Further, the processor 204 can be configured to force the DRX ON state of the first DRX cycle to the DRX OFF state. Further, the processor 204 can be configured to force the first DRX cycle to wake up when the second DRX cycle transits from the DRX OFF state to the DRX ON state or the common DRX time period expires.

In another embodiment, the processor unit 204 can be configured to detect the time duration between start of the DRX ON state of the first DRX cycle and the transition from the DRX OFF state to the DRX ON state of the second DRX cycle meets the common DRX time period. Further, the processor unit 204 can be configured to delay a transition from the DRX OFF state to the DRX ON state of the first DRX cycle by the common DRX time period to align a time duration of the delayed OFF state of the first DRX cycle with an OFF duration of the second DRX cycle when the common DRX criteria is detected. Further, the processor 204 can be configured to force the DRX ON state of the first DRX cycle to the DRX OFF state. Further, the processor 204 can be configured to force the first DRX cycle to wake up when the second DRX cycle transits from the DRX OFF state to the DRX ON state or the common DRX time period expires.

In another embodiment, the processor unit 204 can be configured to detect an uplink data transmission during the DRX OFF state of the first DRX cycle. Further, the processor unit 204 can be configured to delay the transition from the DRX OFF state to the forced DRX ON state of the first DRX cycle by a minimum time duration to align the ON duration of the forced DRX ON state with the ON duration of the second DRX when the common DRX criteria is detected. Further, the processor 204 can be configured to force the DRX ON state of the first DRX cycle to the DRX OFF state. Further, the processor 204 can be configured to force the first DRX cycle to wake up when the second DRX cycle transits from the DRX OFF state to the DRX ON state or the common DRX time period expires.

Further, the communication unit 206 can be configured for communicating internally between the units and externally with networks. Unlike conventional systems and methods, the proposed mechanism ensures that the DRX cycles of both cells are in the sleep state together and in the wake up state together for a maximum duration of time thus, reducing the power consumption of the UE in a Radio Resource Control (RRC) connected state for the dual connectivity.

The FIG. 2 shows exemplary units of the UE 200 but it is to be understood that other embodiments are not limited thereon. In other embodiments, the UE 200 may include less or more number of units. Further, the labels or names of the units are used only for illustrative purpose and does not limit the scope of the disclosure. One or more units can be combined together to perform same or substantially similar function in the UE 200.

Figure 3A:
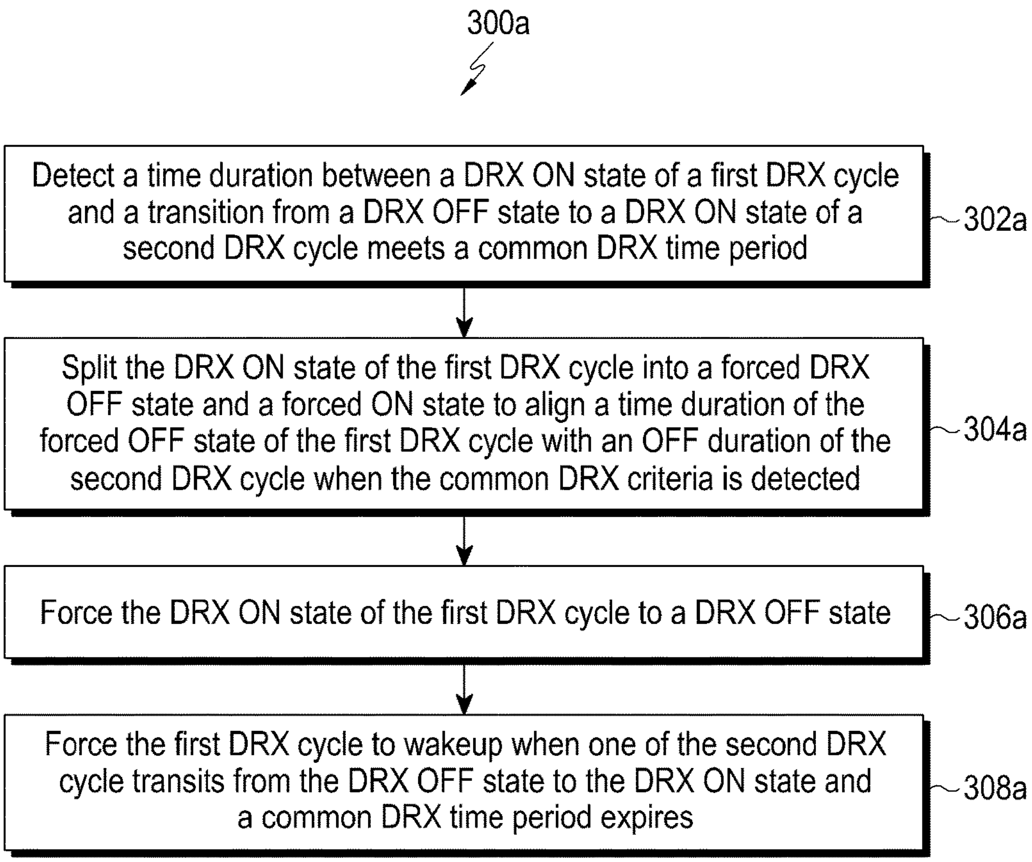
FIG. 3*a* is a flow diagram illustrating a method for splitting a DRX ON state of a first DRX cycle into a forced DRX OFF state and a forced DRX ON state to align a time duration of the forced OFF state of the first DRX cycle with an OFF duration of a second DRX cycle when a common DRX criteria is detected, according to an embodiment as disclosed herein.

FIG. 3*a* is a flow diagram 300*a* illustrating a method for splitting the DRX ON state of the first DRX cycle into the forced DRX OFF state and the forced DRX ON state to align the time duration of the forced OFF state of the first DRX cycle with the OFF duration of the second DRX cycle when the common DRX criteria is detected, according to an embodiment as disclosed herein.

At step 302*a*, the method includes detecting the time duration between the DRX ON state of the first DRX cycle and the transition from the DRX OFF state to the DRX ON state of the second DRX cycle meets the common DRX time period. The method allows the processor unit 204 to detect the time duration between the DRX ON state of the first DRX cycle and the transition from the DRX OFF state to the DRX ON state of the second DRX cycle meets the common DRX time period At step 304*a*, the method includes splitting the DRX ON state of the first DRX cycle into the forced DRX OFF state and the forced ON state to align the time duration of the forced OFF state of the first DRX cycle with the OFF duration of the second DRX cycle when the common DRX criteria is detected. The method allows the processor unit 204 to split the DRX ON state of the first DRX cycle into the forced DRX OFF state and the forced ON state to align the time duration of the forced OFF state of the first DRX cycle with the OFF duration of the second DRX cycle when the common DRX criteria is detected.

At step 306*a*, the method includes forcing the DRX ON state of the first DRX cycle to the DRX OFF state. The method allows the processor unit 204 to force the DRX ON state of the first DRX cycle to the DRX OFF state. At step 308*a*, the method includes forcing the first DRX cycle to wake up when the second DRX cycle transits from the DRX OFF state to the DRX ON state or the common DRX time period expires. The method allows the processor unit 204 to force the first DRX cycle to wake up when the second DRX cycle transits from the DRX OFF state to the DRX ON state or the common DRX time period expires.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

Figure 3B:
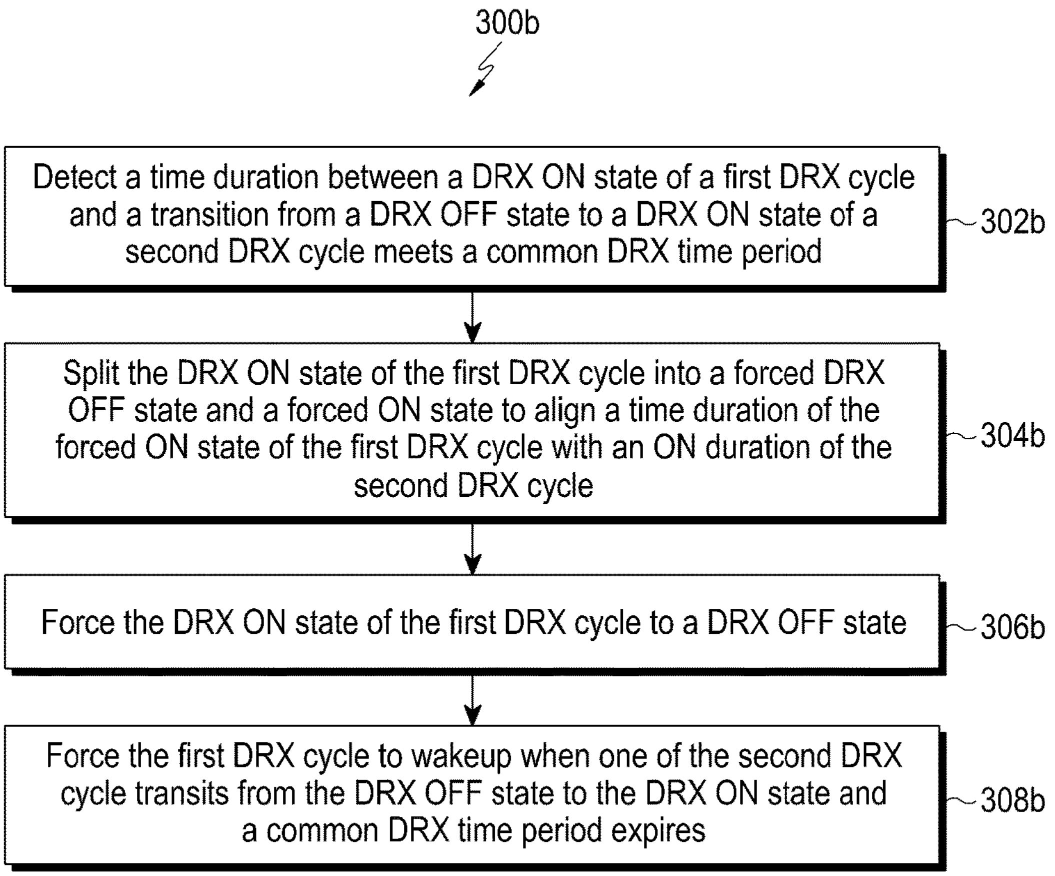
FIG. 3*b* is a flow diagram illustrating a method for splitting a DRX OFF state of a first DRX cycle into a forced DRX OFF state and a forced DRX ON state to align a time duration of the forced ON state of the first DRX cycle with an ON duration of a second DRX cycle, according to an embodiment as disclosed herein.

FIG. 3*b* is a flow diagram 300*b* illustrating a method for splitting the DRX OFF state of the first DRX cycle into the forced DRX OFF state and the forced DRX ON state to align the time duration of the forced ON state of the first DRX cycle with the ON duration of the second DRX cycle, according to an embodiment as disclosed herein.

At step 302*b*, the method includes detecting the time duration between the DRX ON state of the first DRX cycle and the transition from the DRX OFF state to the DRX ON state of the second DRX cycle meets the common DRX time period. The method allows the processor unit 204 to detect the time duration between the DRX ON state of the first DRX cycle and the transition from the DRX OFF state to the DRX ON state of the second DRX cycle meets the common DRX time period.

At step 304*b*, the method includes splitting the DRX ON state of the first DRX cycle into the forced DRX OFF state and the forced ON state to align the time duration of the forced ON state of the first DRX cycle with the ON duration of the second DRX cycle. The method allows the processor unit 204 to split the DRX ON state of the first DRX cycle into the forced DRX OFF state and the forced ON state to align the time duration of the forced ON state of the first DRX cycle with the ON duration of the second DRX cycle.

At step 306*b*, the method includes forcing the DRX ON state of the first DRX cycle to the DRX OFF state. The method allows the processor unit 204 to force the DRX ON state of the first DRX cycle to the DRX OFF state.

At step 308*b*, the method includes forcing the first DRX cycle to wake up when the second DRX cycle transits from the DRX OFF state to the DRX ON state or the common DRX time period expires. The method allows the processor unit 204 to force the first DRX cycle to wake up when the second DRX cycle transits from the DRX OFF state to the DRX ON state or the common DRX time period expires.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

Figure 4:
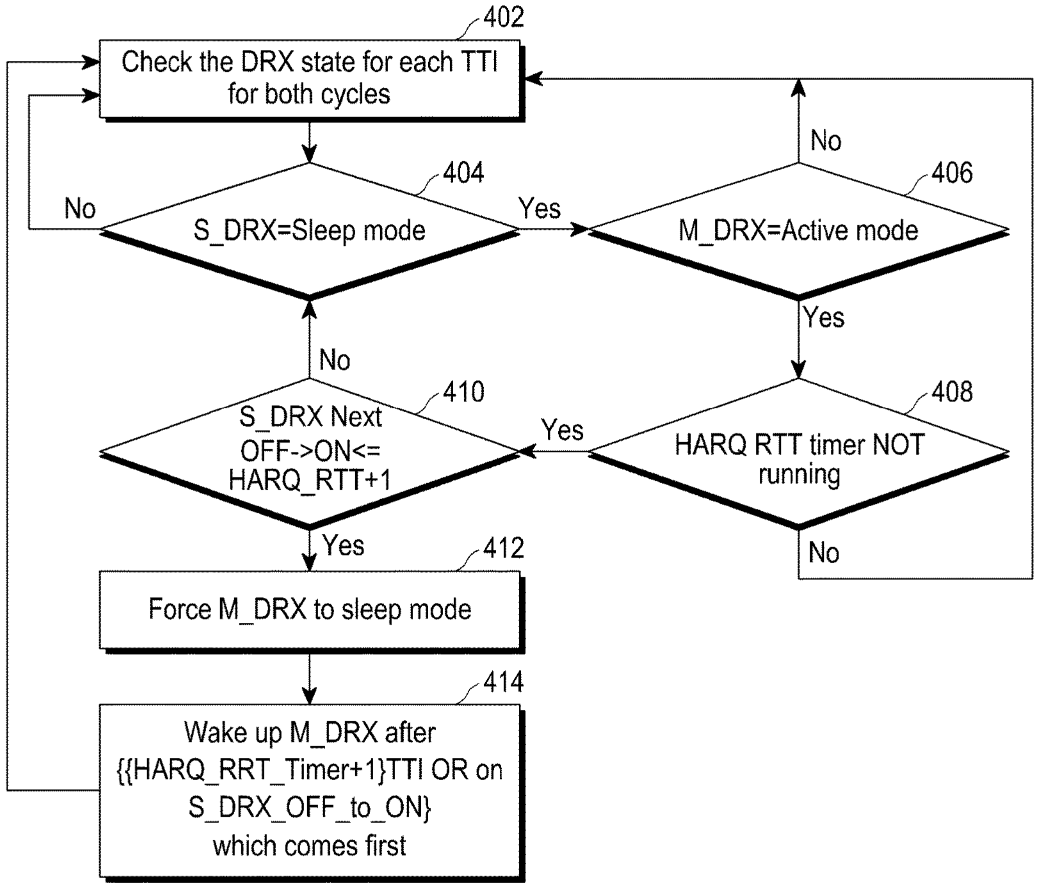
FIG. 4 is a flow diagram illustrating a method for splitting a DRX ON state of a first DRX cycle into a forced DRX OFF state and a forced DRX ON state, according to an embodiment as disclosed herein.

FIG. 4 is a flow diagram 400 illustrating a method for splitting the DRX ON state of the first DRX cycle into the forced DRX OFF state and the forced DRX ON state, according to an embodiment as disclosed herein. At step 402, the method includes checking the DRX state for each TTI for both cycles (i.e., the first DRX cycle and the second DRX cycle). The method allows the processor unit 204 to check the DRX state for each TTI for both cycles.

At step 404, the method includes determining whether the S_DRX (i.e., the first DRX cycle from small eNB) is in the sleep state/DRX OFF state. The method allows the processor unit 204 to determine whether the S_DRX is in the sleep state. If it is determined, at step 404, that the S_DRX is in the sleep state then, at step 406, the method includes determining whether M_DRX (i.e., second DRX cycle from master eNB) is in an active state/DRX ON state. The method allows the processor unit 204 to determine whether the M_DRX is in the active state. If it is determined, at step 404, that the S_DRX is in sleep state and at step 406, that the M_DRX is in the active state then, at step 408, the method includes determining whether HARQ RTT timer is NOT running. The method allows the processor unit 204 to determine whether the HARQ RTT timer is NOT running.

If it is determined, at step 408 that the HARQ RTT timer is NOT running then, at step 410, the method includes determining the time (HARQ_RTT+1) at which the S_DRX switches from OFF state to ON state (S_DRX Next OFF→ON<=HARQ_RTT+1) i.e., detecting the time duration between the DRX ON state of the first DRX cycle and the transition from the DRX OFF state to the DRX ON state of the second DRX cycle meets the common DRX time period). The method allows the processor unit 204 to determine the time (HARQ_RTT+1) at which the S_DRX switches from the OFF state to the ON state (i.e., S_DRX Next OFF→ON<=HARQ_RTT+1). If it is determined, at step 408 that the HARQ RTT timer is running then, the method is looped back to step 402 as described above. If it is determined, at step 406, the M_DRX is not in the active state then, the method is looped back to step 402 as described above. If it is determined, at step 404, the S_DRX is not in the sleep state then, the method 400 is looped back to step 402 as described above.

If it is determined at step 410, that the time at which S_DRX transition from DRX OFF state to ON state is an integer multiple of HARQ_RTT timer+one TTI, then at step 412, the method includes forcing the M_DRX to the sleep state. The method allows the processor unit 204 to force the M_DRX to the sleep state. At step 412, the method includes waking up the M_DRX after (integer multiple of HARQ_RRT_Timer+1) TTI or on the S_DRX_OFF_to_ON whichever comes first. The method allows the processor unit 204 to wake up the M_DRX after (integer multiple of HARQ_RT_Timer+1) TTI or on the S_DRX_OFF_to_ON whichever comes first.

In an embodiment, the technique for splitting the DRX ON state of the first DRX cycle into the forced DRX OFF state and the forced ON state is explained below. Consider a scenario when the S_DRX is in the sleep state while the M_DRX is the ON state and any associated timer is running.

```
if (M_DRX = wake up and S_DRX state = sleep)
{
If (time of S_DRX sleep state to S_DRX wake up state) < =
HARQ_RTT+1
{
Force M_DRX state == Forced sleep state
Update pending_on_duration = CDRX ON duration −
(Forced sleep TTI − ON duration start TTI)
}
}
If (S_DRX state transition from sleep to wake up state)
{
Force M_DRX state = Forced wake up state for
pending_on_duration time
}
```

In an embodiment, the above procedure can also be implemented for the S_DRX as well. In an example, the overall splitting operation of the DRX ON state of the first DRX cycle into the forced DRX OFF state and the forced ON state is explained as below:

Splitting the ON duration or inactivity time of the first DRX cycle by a time gap of HARQ RTT+1 TTI in case the distance from the current TTI in the DRX ON duration or inactivity timer of the first DRX cycle to second DRX cycle OFF to ON transition is equal to the HARQ RTT timer+1 TTI. This has to be performed provided at least 2 TTIs or PDCCH sub frames are pending (in ON state) for reading the PDCCH after delayed wake up cycle and vice versa. Further, the first DRX cycle of the UE 200 will transit back to the DRX ON state after the forced DRX OFF duration is completed (where both the associated DRX cycles such as the first DRX cycle and the second DRX cycles are in the ON state) and complete reading of the PDCCH for the pending ON duration time.

The delayed duration is the HARQ RTT+1 TTI because any PDCCH missed by the UE 200 will inherently be treated as NAK by the network and provides retransmission for the same after the HARQ RTT time. The first potential PDCCH missed is 1 TTI from the forced transition to the DRX OFF State. This approach ensures that both the DRX cycles are in the sleep state together and in the wake up state together for the maximal duration of time and reduces the power consumption of the UE 200. This method is applicable if there is no uplink data. In case, if the uplink data on first DRX cycle is detected, then delay cannot necessarily be till the HARQ RTT timer. The delay can be based on a schedule request (SR) periodicity, a semi persistent scheduling (SPS) periodicity, or if the ON duration for the second DRX cycle<=HARQ RTT timer, then delay this and force wake up the first DRX cycle by the period of time.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

Figure 5:
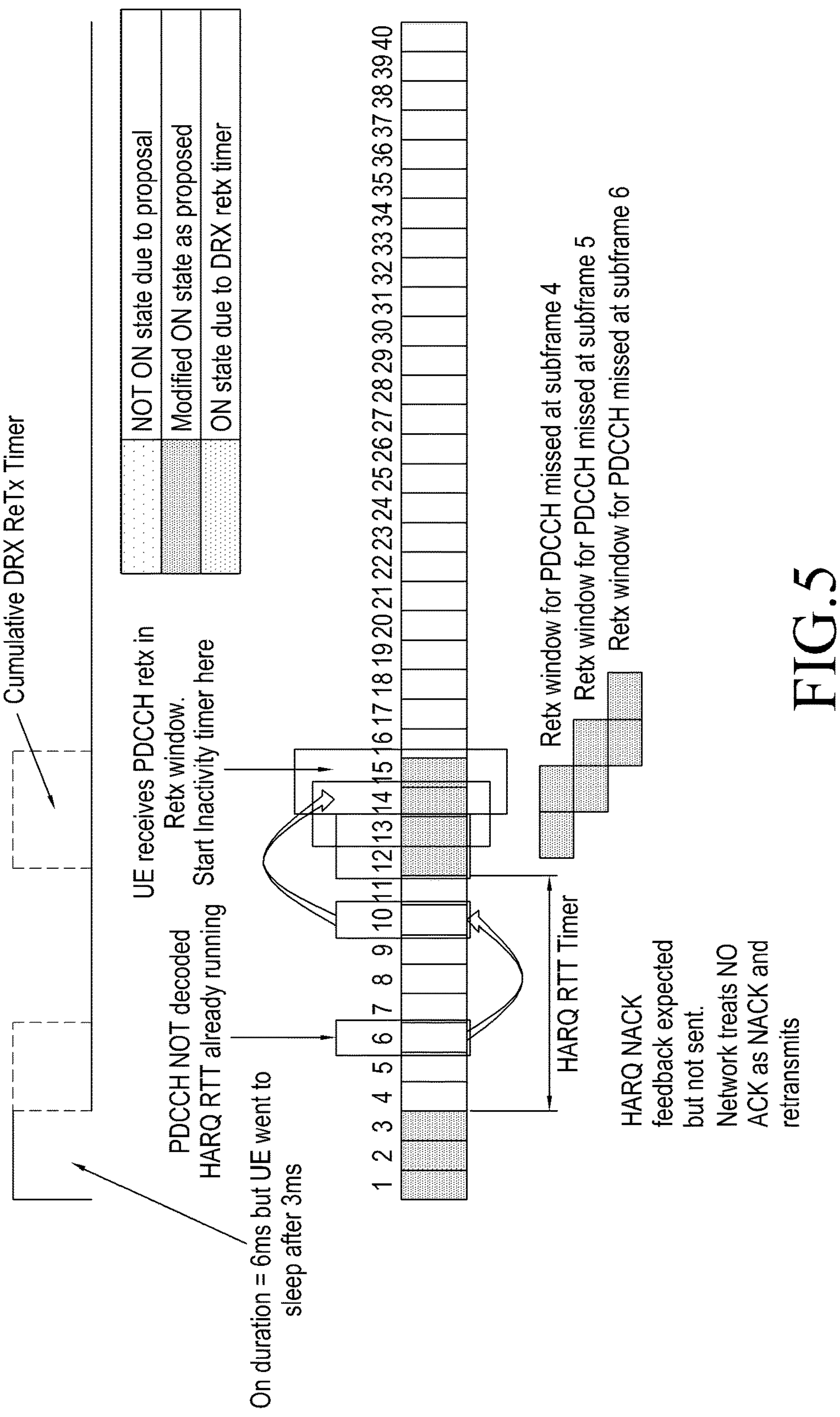
FIG. 5 illustrates a behavior of a Hybrid automatic repeat request (HARQ) retransmission in a C-DRX when the initial transmission from the network is missed by the UE, according to an embodiment as disclosed herein.

FIG. 5 illustrates a behavior of a HARQ retransmission in the C-DRX when the initial transmission from the network is missed by the UE, according to an embodiment as disclosed herein.

In an embodiment, the DRX ON cycle of the UE 200 is 6 ms/TTI. However, the UE 200 automatically enters into the DRX OFF state before expiry of the ON duration of the DRX timer (Say at 3rd ms/TTI) after detecting a common DRX time value as explained in one of the embodiments earlier. For any downlink transmission from the network during this forced sleep/forced DRX OFF state (from 4th TTI to 6th TTI), UE does not receive it as PDCCH is not monitored during the forced sleep state and no HARQ feedback is sent to network. Network typically treats no acknowledgement from the UE as a negative acknowledgement (NACK) and retransmits the same data again after HARQ RTT time. Further, the UE 200 receives the PDCCH retransmission in a retransmission window. In downlink, as the HARQ feedback is asynchronous, network may provide the retransmission within C-DRX retransmission timer (say 2 ms/2 PDCCH sub frames) Therefore, The 12th and 13th ms indicate the retransmission window for the PDCCH missed at sub frame 4. The 13th and 14th ms indicate the retransmission window for the PDCCH missed at sub frame 5. The 14th and 15th ms indicate the retransmission window for the PDCCH missed at sub frame 6.

Further, the UE 200 autonomously enters into the DRX OFF before expiry of the ON duration timer. Due to this, the UE 200 can miss scheduling during those sub frames. Further, the missed transmission can be recovered during the retransmission time window. During TTI, the UE 200 has autonomously entered into the DRX sleep state, during the DRX sleep state if any PDCCH for new DL transmission occurs. The UE 200 does not initiate the DRX inactivity timer as the UE 200 does not monitor the PDCCH. Hence, the UE 200 does not send any HARQ feedback to the network but still the UE 200 triggers the HARQ RTT timer. Further, the network treats NO HARQ feedback as the NACK and performs the retransmission during the expected HARQ retransmission window (i.e., after expiry of the HARQ RTT timer). The UE 200 wakes up for the pending ON duration after the expiry of the HARQ RTT timer. During this wake up cycle, the UE 200 triggers the DRX-retransmission timer for the HARQ processes corresponding to TTI where UE 200 automatically enters into the DRX OFF state. Further, the network retransmits and the UE 200 recovers the previously missed PDCCH assignment.

Figure 6:
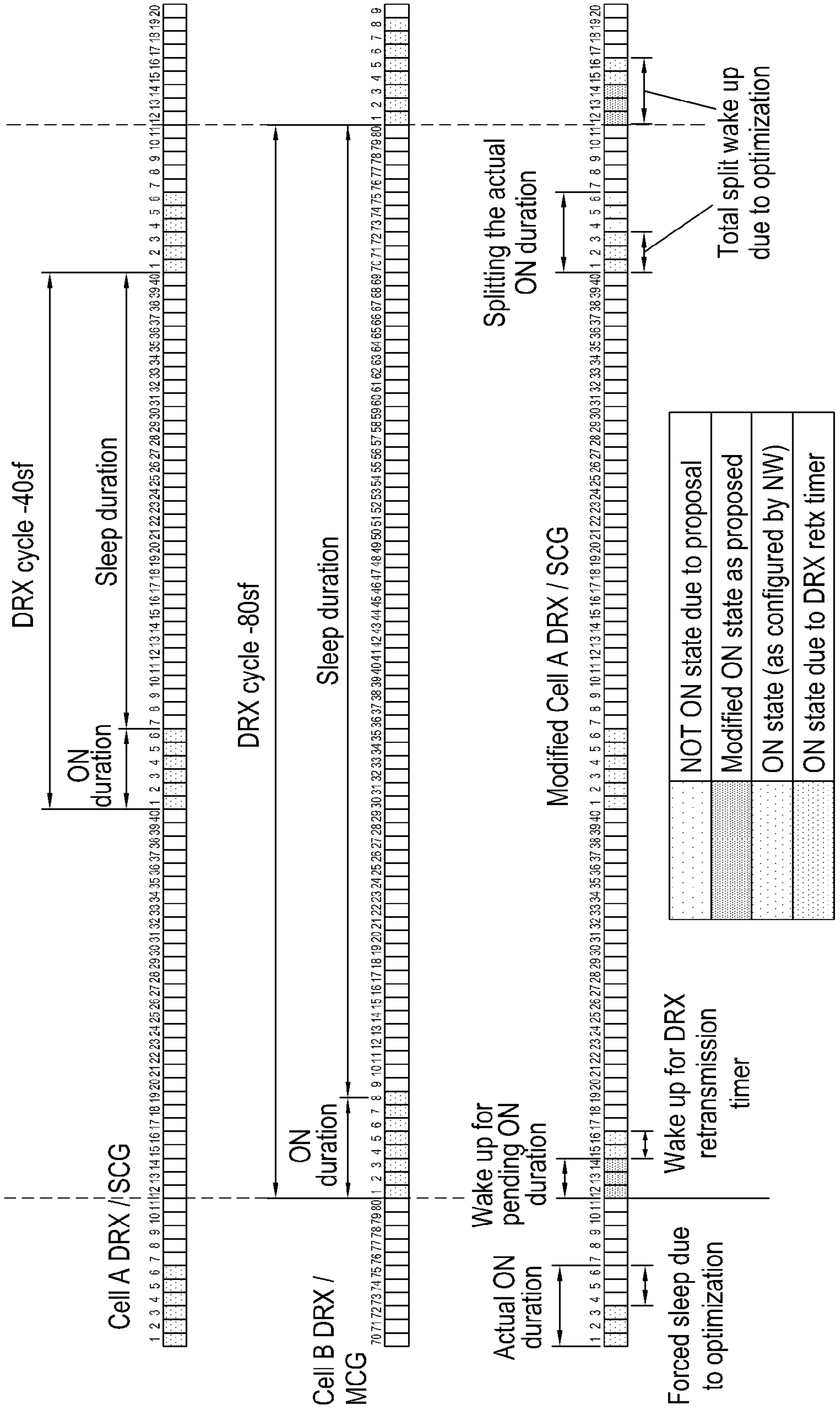
FIG. 6 illustrates a proposed DRX optimization by applying a common DRX at an UE in a multi-connectivity mode, according to an embodiment as disclosed herein.

FIG. 6 illustrates a proposed DRX optimization by applying the common DRX at the UE 200 in the multi-connectivity mode, according to an embodiment as disclosed herein. FIG. 6 illustrates unaligned DRX patterns applied at the UE based on the configurations received from the network. However, the figure illustrates the second DRX cycle length to be an integer multiple of the first DRX cycle length. The figure illustrates the modification of the first DRX cycle pattern based on the embodiment disclosed earlier where the ON state of the first DRX is split to a forced OFF state and a forced ON state. On detecting the satisfaction of the criteria of common DRX timer (HARQ_TT+1 TTI), the first DRX cycle is transitioned from DRX ON state to a forced OFF State. The cycle is transitioned back to ON State on expiry of the common DRX timer or on the transition of second DRX cycle from OFF state to ON state. The first DRX cycle then remains in ON state for the remainder of the ON duration time which was lost due to transition to forced OFF state due to satisfying the common DRX timer.

Figure 7:
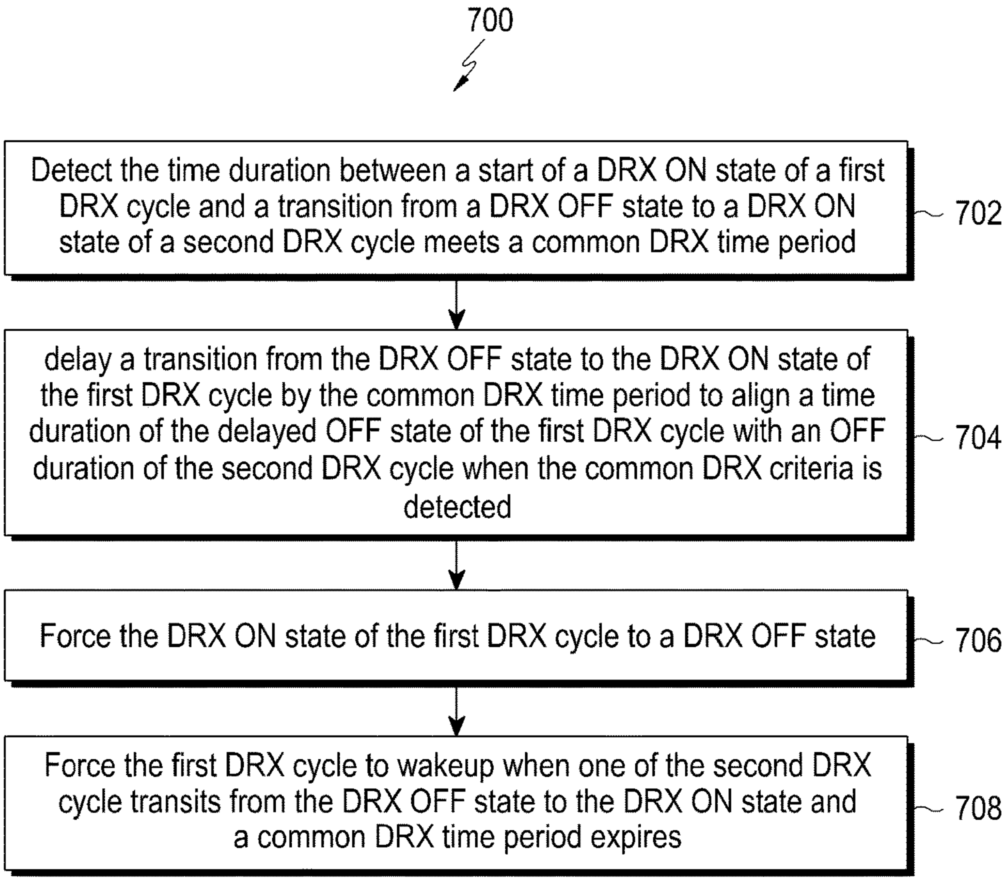
FIG. 7 is a flow diagram illustrating a method for delaying a transition from a DRX OFF state to a DRX ON state of a first DRX cycle by a common DRX time period to align a time duration of a delayed OFF state of the first DRX cycle with an OFF duration of the second DRX cycle when a common DRX criteria is detected, according to an embodiment as disclosed herein.

FIG. 7 is a flow diagram 700 illustrating a method for delaying the transition from the DRX OFF state to the DRX ON state of the first DRX cycle by the common DRX time period to align the time duration of the delayed OFF state of the first DRX cycle with the OFF duration of the second DRX cycle when the common DRX criteria is detected, according to an embodiment as disclosed herein.

At step 702, the method includes detecting the time duration between the start of the DRX ON state of the first DRX cycle and the transition from the DRX OFF state to the DRX ON state of the second DRX cycle meets the common DRX time period. The method allows the processor unit 204 to detect the time duration between the start of the DRX ON state of the first DRX cycle and the transition from the DRX OFF state to the DRX ON state of the second DRX cycle meets the common DRX time period.

At step 704, the method includes delaying the transition from the DRX OFF state to the DRX ON state of the first DRX cycle by the common DRX time period to align the time duration of the delayed OFF state of the first DRX cycle with the OFF duration of the second DRX cycle when the common DRX criteria is detected. The method allows the processor unit 204 to delay the transition from the DRX OFF state to the DRX ON state of the first DRX cycle by the common DRX time period to align the time duration of the delayed OFF state of the first DRX cycle with the OFF duration of the second DRX cycle when the common DRX criteria is detected. At step 706, the method includes forcing the DRX ON state of the first DRX cycle to the DRX OFF state. The method allows the processor unit 204 to force the DRX ON state of the first DRX cycle to the DRX OFF state.

At step 708, the method includes forcing the first DRX cycle to wake up when the second DRX cycle transits from the DRX OFF state to the DRX ON state or the common DRX time period expires. The method allows the processor unit 204 to force the first DRX cycle to wake up when the second DRX cycle transits from the DRX OFF state to the DRX ON state or the common DRX time period expires.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

Figure 8:
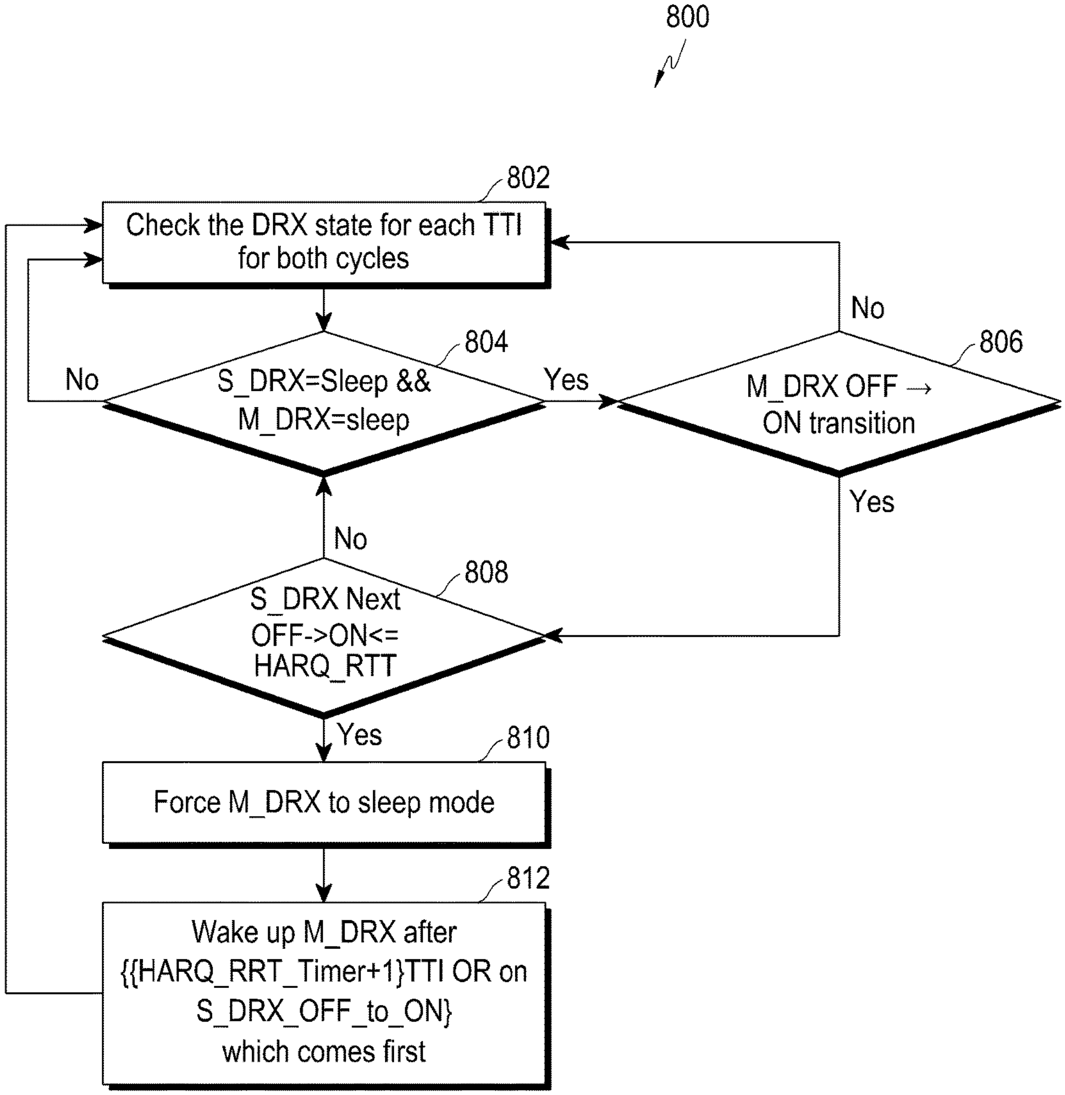
FIG. 8 illustrates a flow diagram illustrating a method for delaying a DRX OFF state of a first DRX cycle by a common DRX time period to align a time duration of a delayed OFF state of the first DRX cycle with an OFF duration of a second DRX cycle, according to an embodiment as disclosed herein.

FIG. 8 illustrates a flow diagram 800 illustrating a method for delaying the DRX OFF state of the first DRX cycle by the common DRX time period to align the time duration of the delayed OFF state of the first DRX cycle with the OFF duration of the second DRX cycle, according to an embodiment as disclosed herein. At step 802, the method includes checking the DRX state for each TTI for both cycles. The method allows the processor unit 204 to check the DRX state for each TTI for both cycles.

At step 804, the method includes determining whether the S_DRX and the M_DRX are in either sleep state or the active state. The method allows the processor unit 204 to determine whether the S_DRX and the M_DRX are in the sleep state or the active state. If it is determined, at step 804, that the S_DRX and the M_DRX are in the sleep state then, at step 806, the method includes determining the time at which the M_DRX switches from the DRX OFF state to the DRX ON state (i.e., M_DRX OFF□ON transition). The method allows the processor unit 204 to determine the time at which the M_DRX switches from the DRX OFF state to the DRX ON state.

If it is determined, at step 806, the time at which the M_DRX is transitioning from the M_DRX OFF state to the M_DRX ON state then, at step 808, the method includes determining the time (HARQ_RTT) at which the S_DRX is transitioning from the S_DRX OFF to ON state (S_DRX Next OFF→ON<=HARQ_RTT i.e., detect the time duration between the start of the DRX ON state of the first DRX cycle and the transition from the DRX OFF state to the DRX ON state of the second DRX cycle meets the common DRX time period). The method allows the processor unit 204 to determine the time (HARQ_RTT) at which the S_DRX is transitioning from the S_DRX OFF to the ON state (S_DRX Next OFF→ON).

If it is determined, at step 808, the time (i.e., HARQ_RTT) at which the S_DRX is transitioning from the S_DRX OFF to ON state then, at step 810, the method includes forcing the M_DRX to continue in sleep state until the time at which the S_DRX transits from the OFF state to ON state. The method allows the processor unit 204 to force the M_DRX to the sleep state until the time at which the S_DRX transits from the OFF state to the ON state.

At step 812, the method includes waking up the M_DRX to the ON state after (HARQ_RRT_Timer) TTI or ON transition of the S_DRX_OFF_to_ON state whichever comes first. The method allows the processor unit 204 to wake up the M_DRX after (HARQ_RT_Timer+1) TTI or on transition of the S_DRX_OFF_to_ON whichever comes first.

In an embodiment, the duration of delay towards the DRX state change is HARQ RTT timer, where the DRX state transition is expected is the first potential occasion for missing the PDCCH order for the network. The retransmission for the same is expected at the HARQ RTT time and hence the UE 200 has to be in the ON state during this time.

Unlike conventional systems and methods, the proposed method ensures that both cells DRX cycles are in the sleep state together and in the wake up state together for the maximal duration and reduces the power consumption of the UE 200.

In an embodiment, the technique for delaying the DRX OFF state of the first DRX cycle by the common DRX time period to align the time duration of the delayed OFF state of the first DRX cycle with the OFF duration of the second DRX cycle is given below. Consider a scenario when both of the S_DRX and the M_DRX are in the sleep state and the M_DRX state is going to change from OFF to ON.

```
if (M_DRX state transition from sleep to wake up state)
{
If time(S_DRX sleep state to S_DRX wake up state) < = HARQ_RTT
{
Force M_DRX state == Forced sleep state
Update pending_on_duration = CDRX ON duration
}
}
If (S_DRX state transition from sleep to wake up state)
{
Force M_DRX state = Forced wake up state for pending_on_duration
time
}
```

In an embodiment, the above procedure is implemented for the S_DRX as well. In an example, the method implemented for delaying the DRX OFF state of the first DRX cycle by the common DRX time period to align the time duration of the delayed OFF state of the first DRX cycle with the OFF duration of the second DRX cycle is explained as below:

Delaying the ON duration by HARQ RTT time in case the distance from the start of the ON duration of the first DRX cycle to OFF to ON transition of the second DRX cycle is equal to HARQ RTT timer. This will allow the UE 200 to be in sleep state on both the DRX cycles (i.e., complete sleep as both DRX cycles are in the sleep state) and reduce the power consumption involved in Radio frequency (RF) and baseband processing of the DRX cycle (the DRX cycle which has been delayed) or vice versa.

The first DRX cycle of the UE 200 transits from the DRX OFF to the DRX ON state at the same time as that of the second DRX cycle. The duration of delay towards the DRX state change is HARQ RTT timer as the 1st TTI where the DRX state transition is expected is the first potential occasion for missing the PDCCH order for the network associated with the DRX cycle. The retransmission for the same is expected at the HARQ RTT time and hence the UE 200 needs to be in ON state during this time. This method ensure that both the DRX cycles are in the sleep state together and in the wake up state together for maximal duration and reduces the power consumption of the UE 200.

This method is also applicable if there is no uplink data. In case if there is the uplink data with the first DRX cycle then delay cannot necessarily be till HARQ RTT timer. The delay can be based on the SR periodicity or SPS periodicity or if the ON duration for the second DRX cycle<=HARQ RTT timer, then delay this force wake up of the first DRX cycle by that period of time.

Unlike conventional methods and systems, the proposed mechanism delays the DRX OFF to the DRX ON transition of the configured DRX cycles based on the state of the other configured DRX cycle. The DRX state of the first DRX cycle monitors the DRX state of the second DRX cycle and takes the decision of waking up during its configured DRX cycle or to delay its transition to ON state in order to reduce power consumption.

Figure 9:
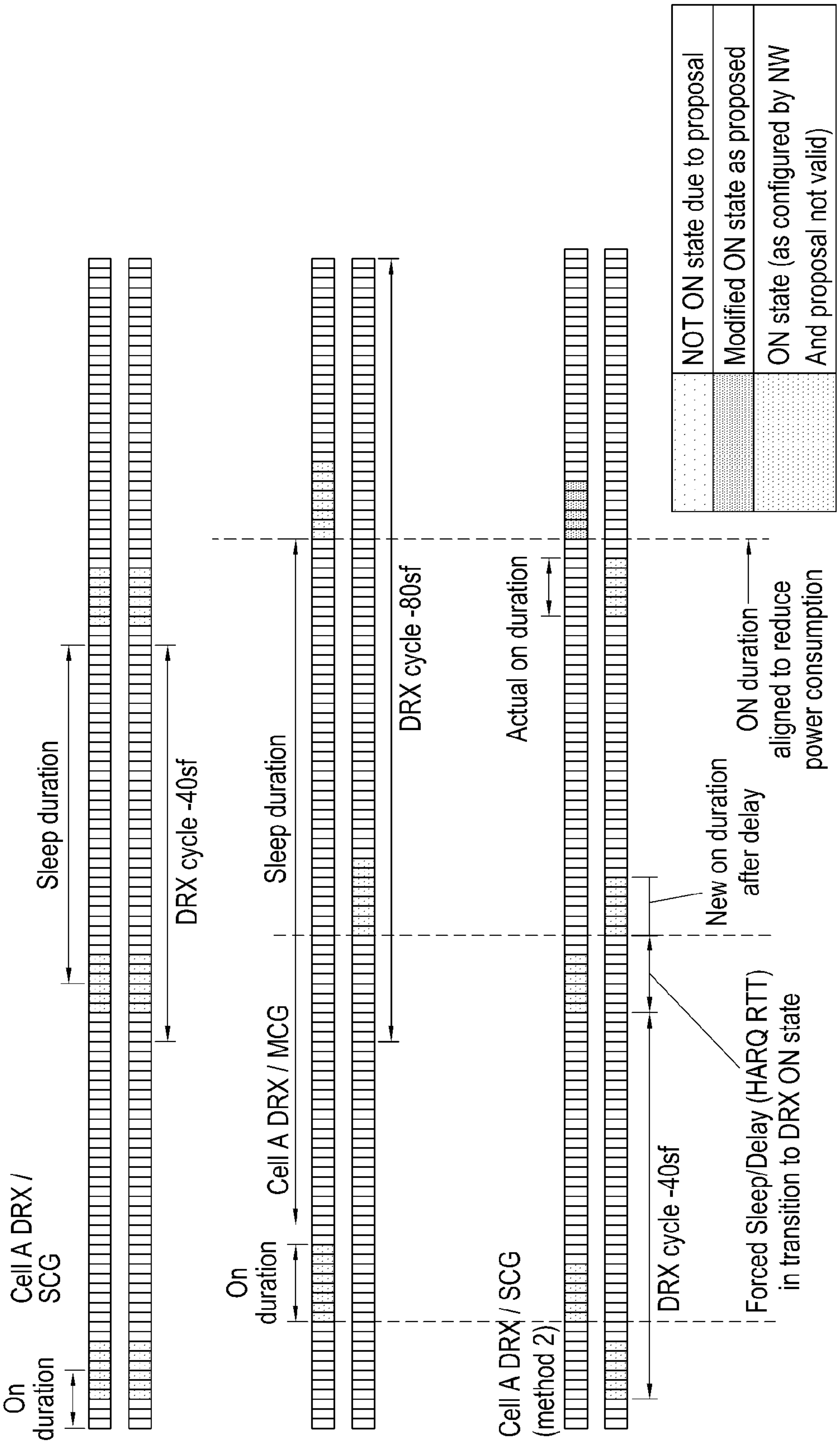
FIG. 9 illustrates a proposed DRX optimization by delaying a DRX OFF state of a first DRX cycle by a common DRX time period to align a time duration of a delayed OFF state of the first DRX cycle with an OFF duration of a second DRX cycle, according to an embodiment as disclosed herein.

FIG. 9 illustrates proposed DRX optimization by delaying the DRX OFF state of the first DRX cycle by the common DRX time period to align the time duration of the delayed OFF state of the first DRX cycle with the OFF duration of the second DRX cycle, according to an embodiment as disclosed herein. FIG. 9 illustrates unaligned DRX patterns applied at the UE based on the configurations received from the network. However, the figure illustrates the second DRX cycle length to be an integer multiple of the first DRX cycle length and the time difference between the transits to ON state of second DRX lags that of first DRX by HARQ_RTT duration. The figure illustrates the modification of the first DRX cycle pattern based on the embodiment disclosed earlier where the transition to ON state of the first DRX is delayed. On detecting the satisfaction of the criteria of common DRX timer (HARQ_TT TTI), the first DRX cycle is continued in DRX OFF. The cycle is transitioned to ON State on expiry of the common DRX timer or on the transition of second DRX cycle from OFF state to ON state. The first DRX cycle then remains in ON state for the ON duration time which was lost due to prolonged stay in forced OFF state due to satisfying the common DRX timer.

Figure 10:
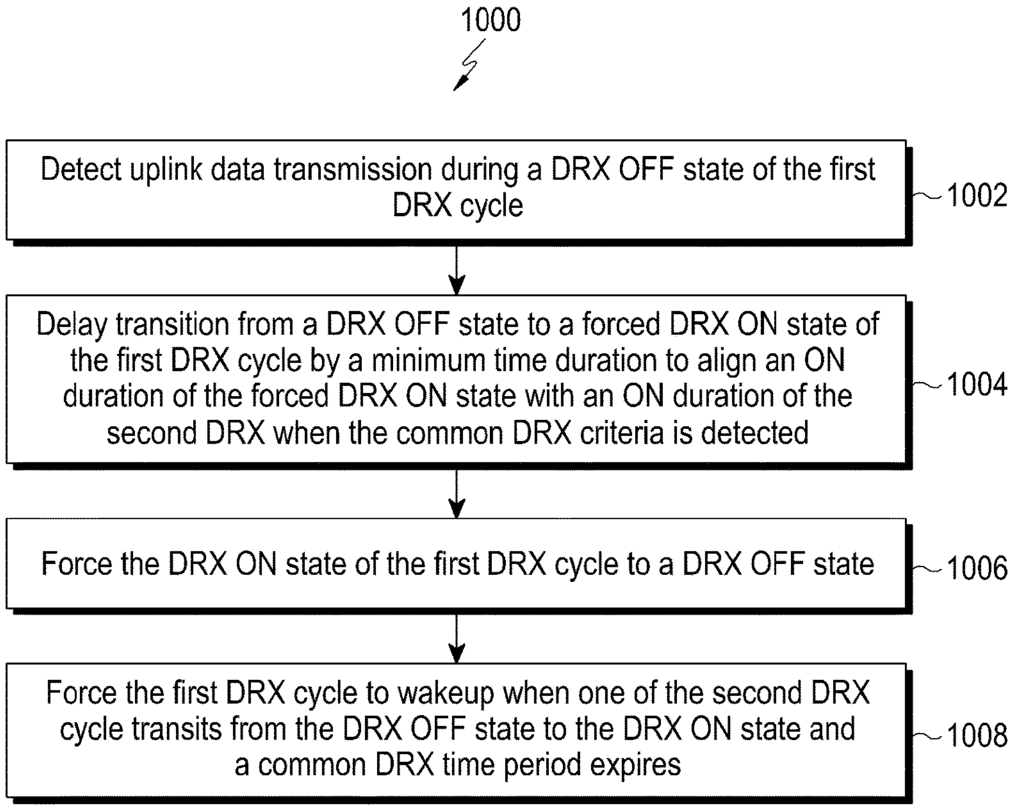
FIG. 10 is a flow diagram illustrating a method for delaying transition from a DRX OFF state to a forced DRX ON state of a first DRX cycle due to availability of uplink data for transmission, by a minimum time duration to align an ON duration of the forced DRX ON state with an ON duration of a second DRX when a common DRX criteria is detected, according to an embodiment as disclosed herein.

FIG. 10 is a flow diagram 1000 illustrating a method for delaying transition from the DRX OFF state to the forced DRX ON state of the first DRX cycle due to availability of uplink data for transmission, by the minimum time duration to align the ON duration of the forced DRX ON state with the ON duration of the second DRX when the common DRX criteria is detected, according to an embodiment as disclosed herein.

At step 1002, the method includes arrival of up-linking data for transmission during the DRX OFF state of the first DRX cycle. The method allows the processor unit 204 to uplink data transmission during the DRX OFF state of the first DRX cycle.

At step 1004, the method includes delaying transition from the DRX OFF state to the forced DRX ON state of the first DRX cycle by the minimum time duration to align the ON duration of the forced DRX ON state with the ON duration of the second DRX when the common DRX criteria is detected. The method allows the processor unit 204 to delay the transition from the DRX OFF state to the forced DRX ON state of the first DRX cycle by the minimum time duration to align the ON duration of the forced DRX ON state with the ON duration of the second DRX when the common DRX criteria is detected.

At step 1006, the method includes forcing the DRX ON state of the first DRX cycle to the DRX OFF state. The method allows the processor unit 204 to force the DRX ON state of the first DRX cycle to the DRX OFF state.

At step 1008, the method includes forcing the first DRX cycle to wake up when the second DRX cycle transits from the DRX OFF state to the DRX ON state or the common DRX time period expires. The method allows the processor unit 204 to force the first DRX cycle to wake up when the second DRX cycle transits from the DRX OFF state to the DRX ON state or the common DRX time period expires.

Figure 11:
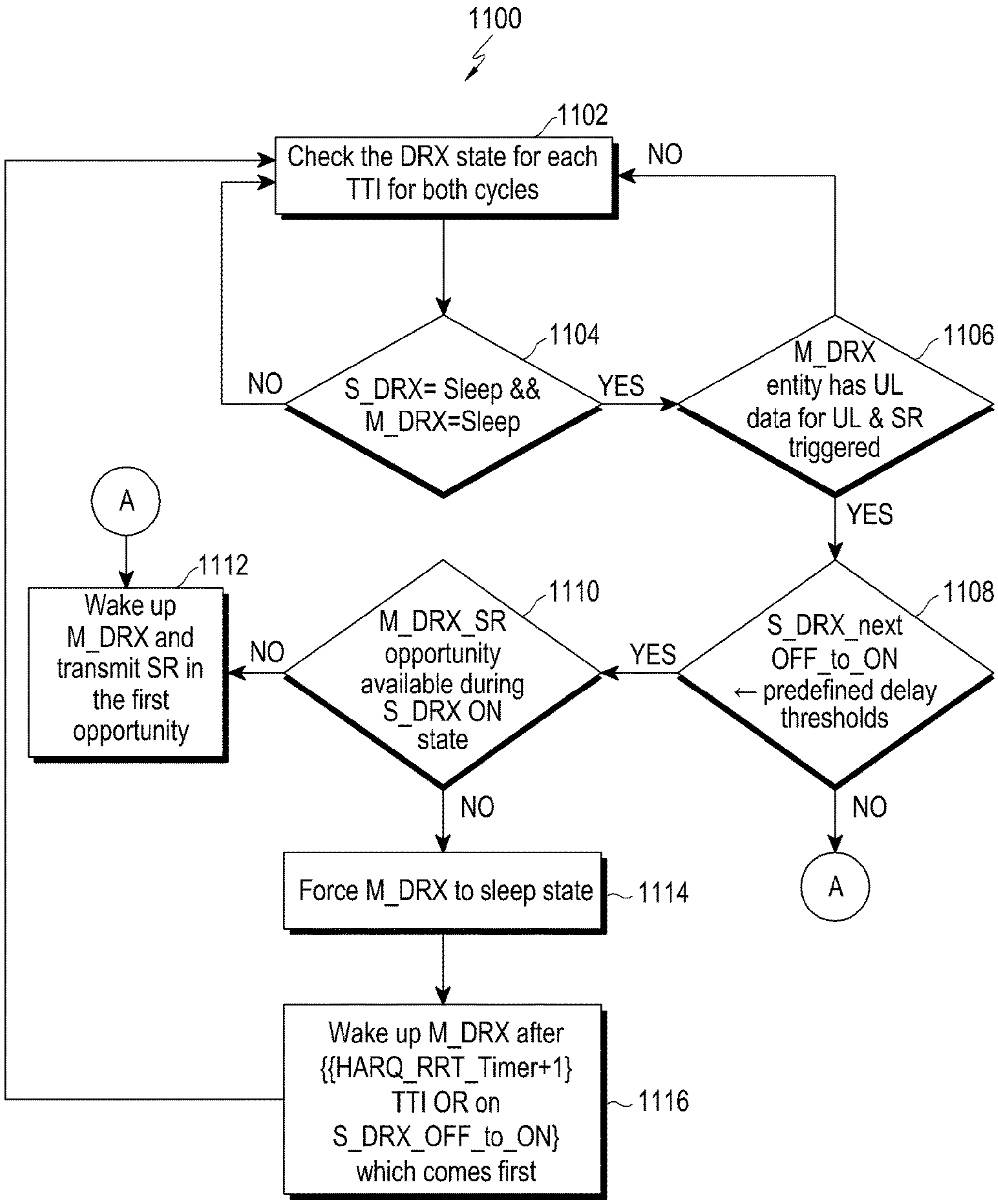
FIG. 11 is a flow diagram illustrating a method for delaying transition from a DRX OFF state to a forced DRX ON state of a first DRX cycle by a minimum time duration to align an ON duration of the forced DRX ON state with an ON duration of a second DRX, according to an embodiment as disclosed herein.

FIG. 11 is a flow diagram 1100 illustrating a method for delaying transition from the DRX OFF state to the forced DRX ON state of the first DRX cycle by minimum time duration to align the ON duration of the forced DRX ON state with the ON duration of the second DRX cycle, according to an embodiment as disclosed herein. At step 1102, the method includes checking the DRX state for each TTI for both cycles. The method allows the processor unit 204 to check the DRX state for each TTI for both cycles.

At step 1104, the method includes determining whether the S_DRX and the M_DRX is in the sleep mode or the active mode. The method allows the processor unit 204 to determine whether the S_DRX and the M_DRX are in the sleep state or the active state. At step 1104, if it is determined that the S_DRX and M_DRX are not in the sleep state then, the method is looped back to step 1102 as describe above. If it is determined, at step 1104, that the S_DRX and the M_DRX are in the sleep state then, at step 1106, the method includes determining whether the M_DRX has the UL data for transmission. Further, if the UL data is available for transmission, the SR will be triggered. The method allows the processor unit 204 to determine whether the M_DRX has the UL data for transmission and to trigger the SR. If it is determined, at step 1106, that the M_DRX not having the UL data for the transmission then, the method is looped back to step 1102 as described above. If it is determined, at step 1106, that the M_DRX has the UL data for the transmission then, at step 1108, the method includes determining whether the time at which the S_DRX transition from the OFF to ON state is within a predefined threshold.

If it is determined, at step 1108, that the time at which the S_DRX transition from the OFF to ON state is within the predefined thresholds then, at step 1110, the method includes determining whether the M_DRX schedule request opportunity is available during the S_DRX ON state. The method allows the processor unit 204 to determine the M_DRX schedule request opportunity available during the S_DRX ON state.

If it is determined, at step 1110, that the M_DRX schedule request opportunity is unavailable during the S_DRX ON state then, at step 1112, the method includes waking up the M_DRX OFF to ON and transmit the schedule request in the first opportunity. The method allows the processor unit 204 to wake up the M_DRX OFF to ON and transmit the schedule request in the first opportunity. If it is determined, at step 1110, that the M_DRX schedule request opportunity is available during the S_DRX ON state then, at step 1114, the method includes forcing the M_DRX to the sleep state. The method allows the processor unit 204 to force the M_DRX to the sleep state.

At step 1116, the method includes waking up the M_DRX to ON state after (HARQ_RT_Timer+1) TTI or on transition of the S_DRX_OFF_to_ON state whichever comes first. The method allows the processor unit 204 to wake up the M_DRX after (HARQ_RT_Timer+1) TTI or on transition of the S_DRX_OFF_to_ON whichever comes first. If it is determined, at step 1108, that the time at which the S_DRX transition from the OFF to ON state exceeds the predefined thresholds then, the method is looped back to step 1112 as described above.

In an embodiment, the technique for delaying transition from the DRX OFF state to the forced DRX ON state of the first DRX cycle by minimum time duration to align the ON duration of the forced DRX ON state with the ON duration of the second DRX is given below.

```
If (((S_DRX == sleep) AND (M_DRX == sleep)))
{
if (M_DRX == UL data available for transmission and SR is
triggered)
{
        if (S_DRX_next_OFF_to_ON <= predefined delay
        threshold)
    {
if (M_DRX SR occasion is present within S_DRX ON state
time)
{
No immediate forced DRX state transition from OFF to ON state
to transmit SR
Maintain M_DRX = sleep state;
wake up M_DRX when S_DRX transition to ON state, or
Wake up M_DRX when MCG SR occasion on PUCCH is
expected, or
When SR not configured on PUCCH, wake up M_DRX when
PRACH channel is available after wake up, follow normal DRX related
operation
}
    }
    }
}
```

In an embodiment, the above procedure is implemented for the S_DRX as well.

In an example, the method implemented for delaying transition from the DRX OFF state to the forced DRX ON state of the first DRX cycle by the minimum time duration to align the ON duration of the forced DRX ON state with the ON duration of the second DRX cycle is explained as below:

Delaying the transition to the forced DRX ON state (to transmit SR) by the minimum duration in such a way that the forced ON duration aligns with the ON duration of the other DRX cycle which is expected to be in normal transition to the ON state. This delaying shall happen such that PUCCH/PRACH resources or SPS periodicity are available during the ON duration after delayed forced wake up.

This method ensure that the power consumption is reduced as both the first DRX cycle (i.e., the DRX cycle with the forced DRX ON state for the UL transmission and other with normal DRX ON state) are in the ON state during the same time (for the duration of the DRX which is configured with shorter ON state timers). Otherwise, both the DRX cycles may be ON at different times and the effective time for which the UE 200 sleeps (complete baseband and RF for all the active networks) is very less.

Unlike conventional systems and methods, the proposed mechanism configured to delay the DRX OFF to the forced DRX ON transition for sending the scheduling request for pending the uplink data. Determining a channel on which the uplink data is pending for transmission monitors its own as well as the other DRX states in order to take the decision of performing the forced DRX transition to the ON state based on the expected result of minimizing power consumption.

Figure 12:
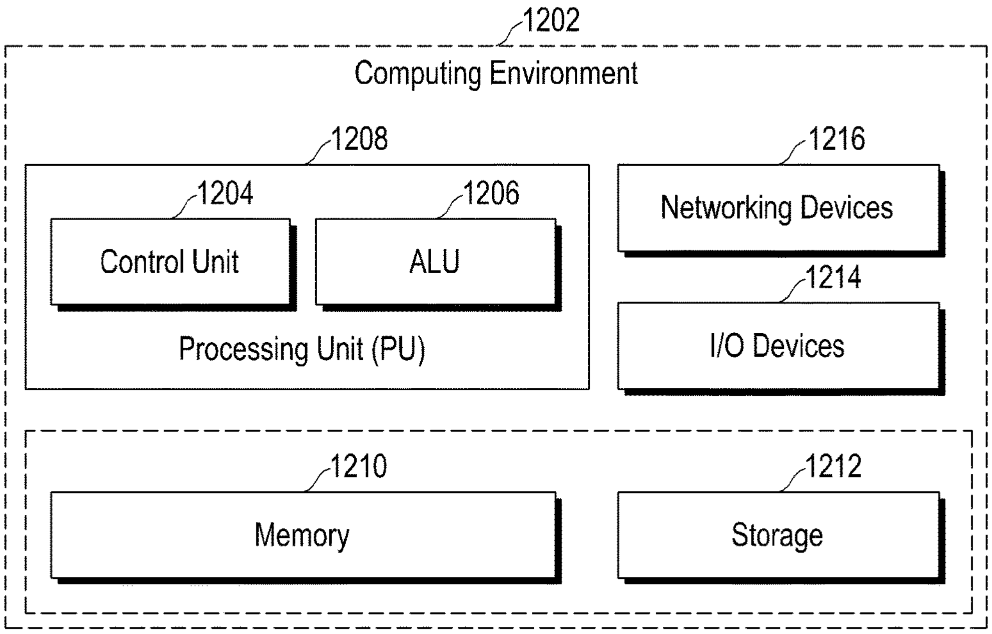
FIG. 12 illustrates a computing environment implementing the method and system for configuring a common DRX configuration at a UE in a multi-connectivity mode, according to an embodiment as disclosed herein.

FIG. 12 illustrates a computing environment implementing the method and system for configuring the common DRX configuration at the UE 200 in the multi-connectivity mode, according to an embodiment as disclosed herein. As depicted the computing environment 1202 comprises at least one processing unit 1208 that is equipped with a control unit 1204 and an Arithmetic Logic Unit (ALU) 1206, a memory 1210, a storage unit 1212, plurality of networking devices 1216 and a plurality Input output (I/O) devices 1214. The processing unit 1208 is responsible for processing the instructions of the algorithm. The processing unit 1208 receives commands from the control unit 1208 in order to perform its processing. Further, any logical and arithmetic operations involved in the execution of the instructions are computed with the help of the ALU 1206.

The embodiments disclosed herein can be implemented through at least one software program running on at least one hardware device and performing network management functions to control the elements. The elements shown in the FIGS. 1*a* to 12 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for applying a common discontinuous reception (DRX) configuration at a user equipment (UE) in a multi-connectivity mode, the method comprising:
- detecting, by the UE, a common DRX criteria;
- forcing, by the UE, a DRX on state of a first DRX cycle to a DRX off state in response to detecting the common DRX criteria; and
- forcing, by the UE, the first DRX cycle to wake up when a second DRX cycle transits from a DRX off state to a DRX on state or a common DRX time period expires.

2. The method of claim 1,
wherein the common DRX criteria is that a time duration between the DRX on state of the first DRX cycle and a transition from the DRX off state to the DRX on state of the second DRX cycle meets the common DRX time period.

3. The method of claim 1,
wherein the DRX on state of the first DRX cycle is split into a forced DRX off state and a forced DRX on state to align a time duration of the forced DRX off state of the first DRX cycle with a time duration of the DRX off state of the second DRX cycle when the common DRX criteria is detected.

4. The method of claim 1,
wherein the DRX on state of the first DRX cycle is split into a forced DRX off state and a forced DRX on state to align a time duration of the forced DRX on state of the first DRX cycle with a time duration of the DRX on state of the second DRX cycle.

5. The method of claim 1, wherein a transition from the DRX off state to the DRX on state of the first DRX cycle is delayed by the common DRX time period to align a time duration of the delayed off state of the first DRX cycle with a time duration of the DRX off state of the second DRX cycle when the common DRX criteria is detected.

6. The method of claim 1, wherein a transition from the DRX off state to the DRX on state of the first DRX cycle is delayed by the common DRX time period to align a time duration of the forced on state of the first DRX cycle with a time duration of the DRX on state of the second DRX cycle.

7. The method of claim 1, wherein the common DRX criteria is uplink data transmission during the DRX off state of the first DRX cycle and a first DRX schedule request opportunity is available during the on state of the second DRX cycle.

8. The method of claim 1, wherein the common DRX time period comprises a time period of a hybrid automatic repeat request round trip time (HARQ RTT) and a time period of at least one transmission time interval (TTI).

9. A user equipment (UE) for applying a common discontinuous reception (DRX) configuration in a multi-connectivity mode, the UE comprising:
a memory unit; and
a processor unit, coupled to the memory unit, configured to:
detect a common DRX criteria;
force a DRX on state of a first DRX cycle to a DRX off state in response to detecting the common DRX criteria; and
force the first DRX cycle to wake up when a second DRX cycle transits from a DRX off state to a DRX on state or a common DRX time period expires.

10. The UE of claim 9,
wherein the common DRX criteria is that a time duration between the DRX on state of the first DRX cycle and a transition from the DRX off state to the DRX on state of the second DRX cycle meets the common DRX time period.

11. The UE of claim 9,
wherein the DRX on state of the first DRX cycle is split into a forced DRX off state and a forced DRX on state to align a time duration of the forced DRX off state of the first DRX cycle with a time duration of the DRX off state of the second DRX cycle when the common DRX criteria is detected.

12. The UE of claim 9,
wherein the DRX on state of the first DRX cycle is split into a forced DRX off state and a forced DRX on state to align a time duration of the forced DRX on state of the first DRX cycle with a time duration of the DRX on state of the second DRX cycle.

13. The UE of claim 9,
wherein a transition from the DRX off state to the DRX on state of the first DRX cycle is delayed by the common DRX time period to align a time duration of the delayed off state of the first DRX cycle with a time duration of the DRX off state of the second DRX cycle when the common DRX criteria is detected.

14. The UE of claim 9, wherein a transition from the DRX off state to the DRX on state of the first DRX cycle is delayed by the common DRX time period to align a time duration of the forced on state of the first DRX cycle with a time duration of the DRX on state of the second DRX cycle.

15. The UE of claim 9, wherein the common DRX criteria is uplink data transmission during the DRX off state of the first DRX cycle and a first DRX schedule request opportunity is available during the on state of the second DRX cycle.

16. The UE of claim 9, wherein the common DRX time period comprises a time period of a Hybrid automatic repeat request Round Trip Time (HARQ RTT) and a time period of at least one Transmission Time Interval (TTI).

17. The UE of claim 9, wherein the common DRX time period comprises a time period of an integer multiple of a HARQ RTT and a time period of at least one TTI.

18. The UE of claim 9, wherein the common DRX time period comprises a time period of a HARQ RTT.

19. The UE of claim 9, wherein the common DRX time period comprises a time period of an integer multiple of a HARQ RTT.

20. A computer program product comprising computer executable program code recorded on a computer readable non-transitory storage medium, the computer executable program code when executed causing actions including:
detecting, by a user equipment (UE), a common discontinuous reception (DRX) criteria;
forcing, by the UE, a DRX on state of a first DRX cycle to a DRX off state in response to detecting the common DRX criteria; and
forcing, by the UE, the first DRX cycle to wake up when a second DRX cycle transits from a DRX off state to a DRX on state and a common DRX time period expires.

* * * * *